J. C. GEBHART.
MACHINE FOR MEASURING TEXTILE FABRIC AND COMPUTING THE PRICE THEREOF.
APPLICATION FILED FEB. 21, 1917.
1,252,258.
Patented Jan. 1, 1918.
4 SHEETS—SHEET 1.
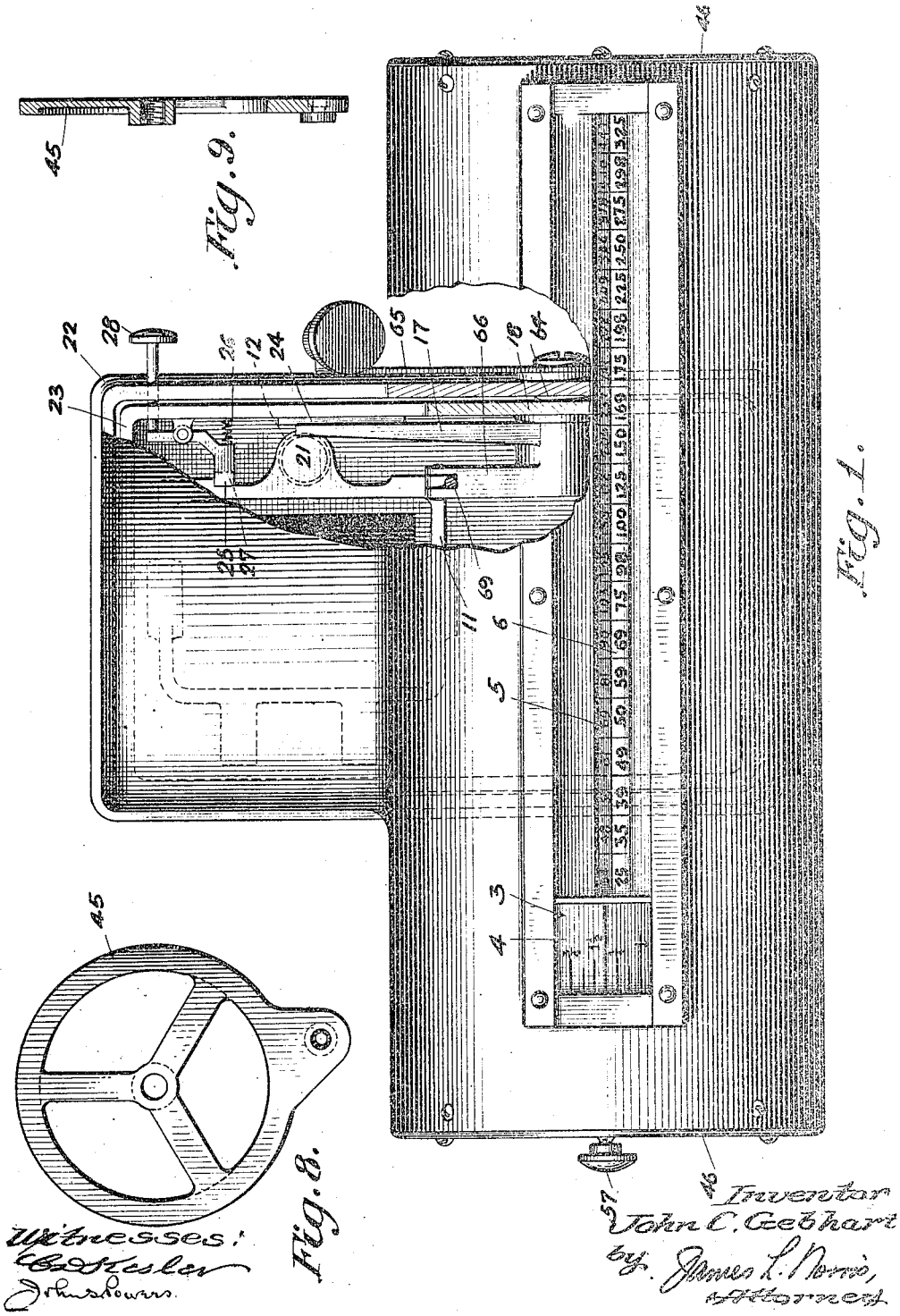

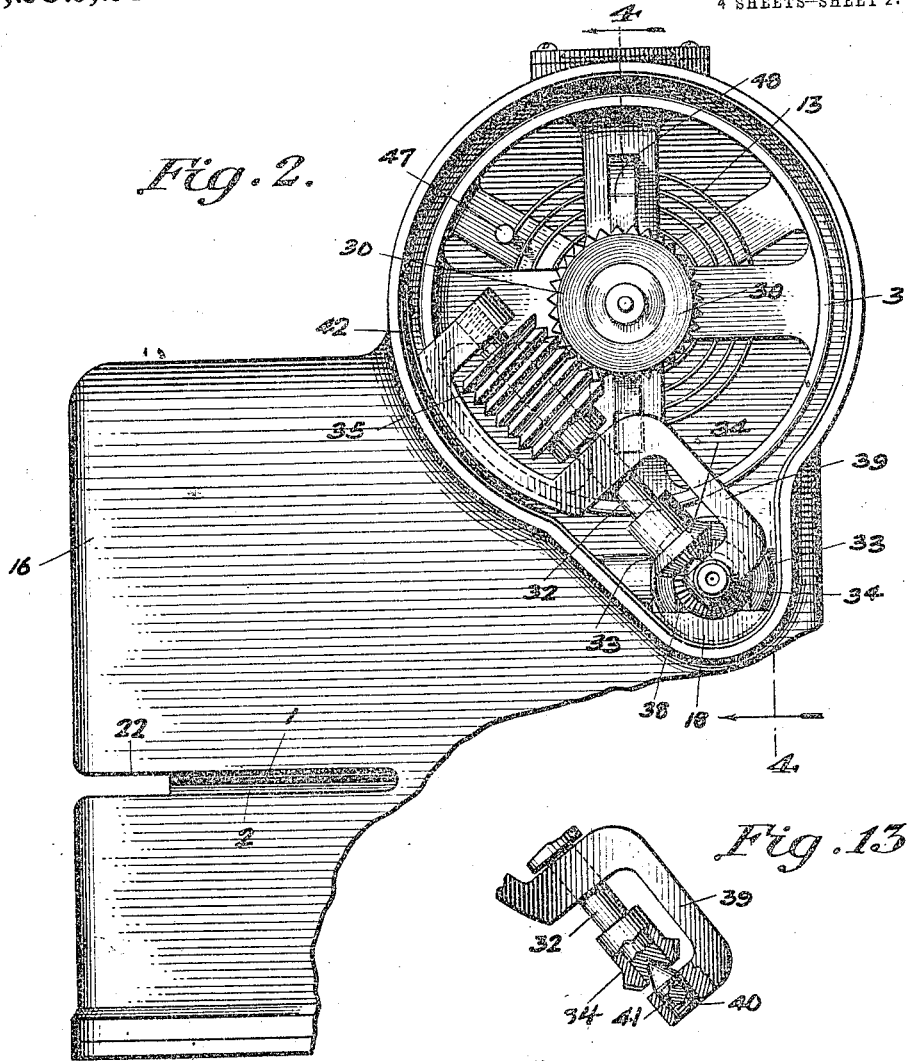

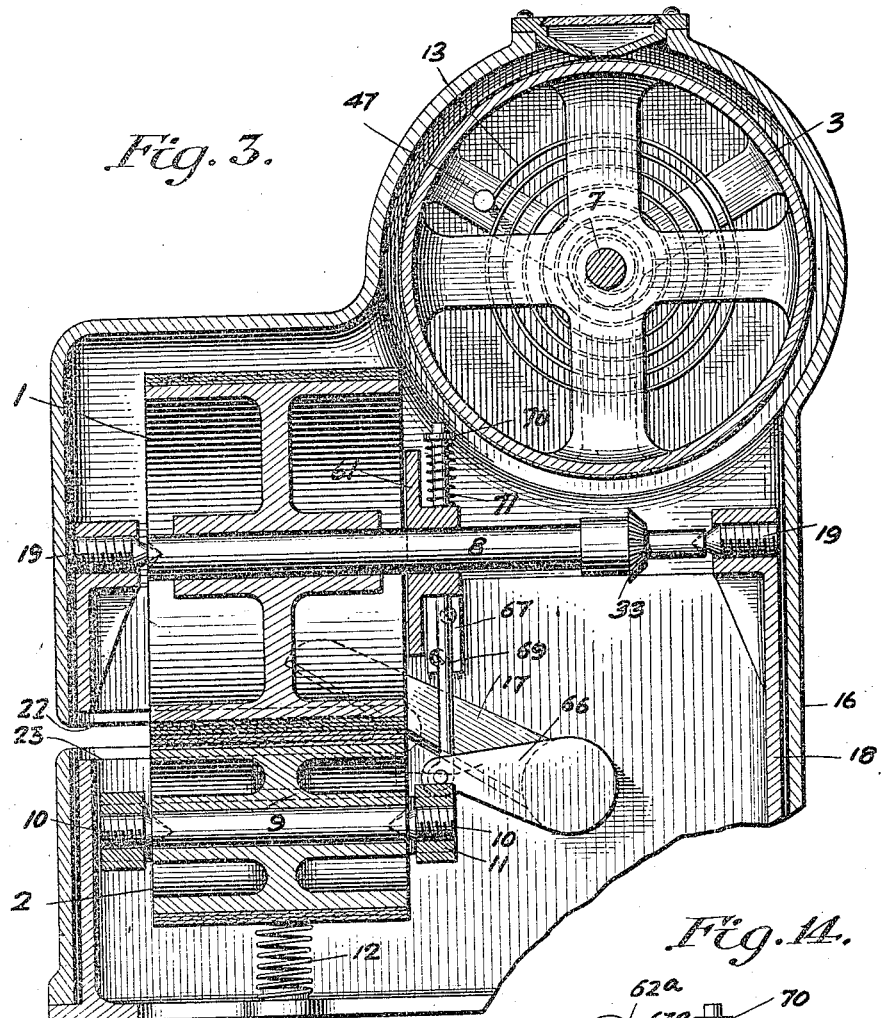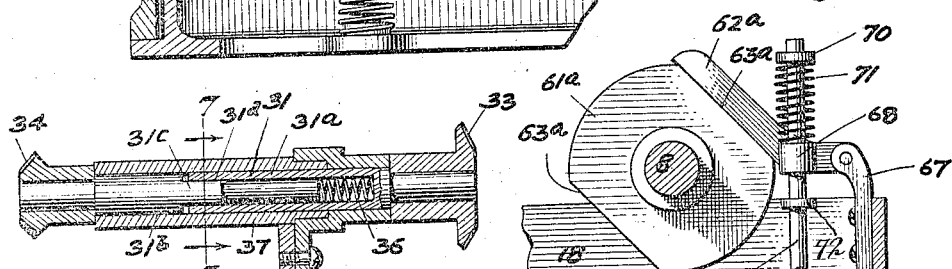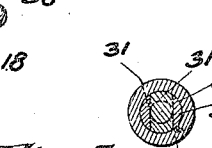

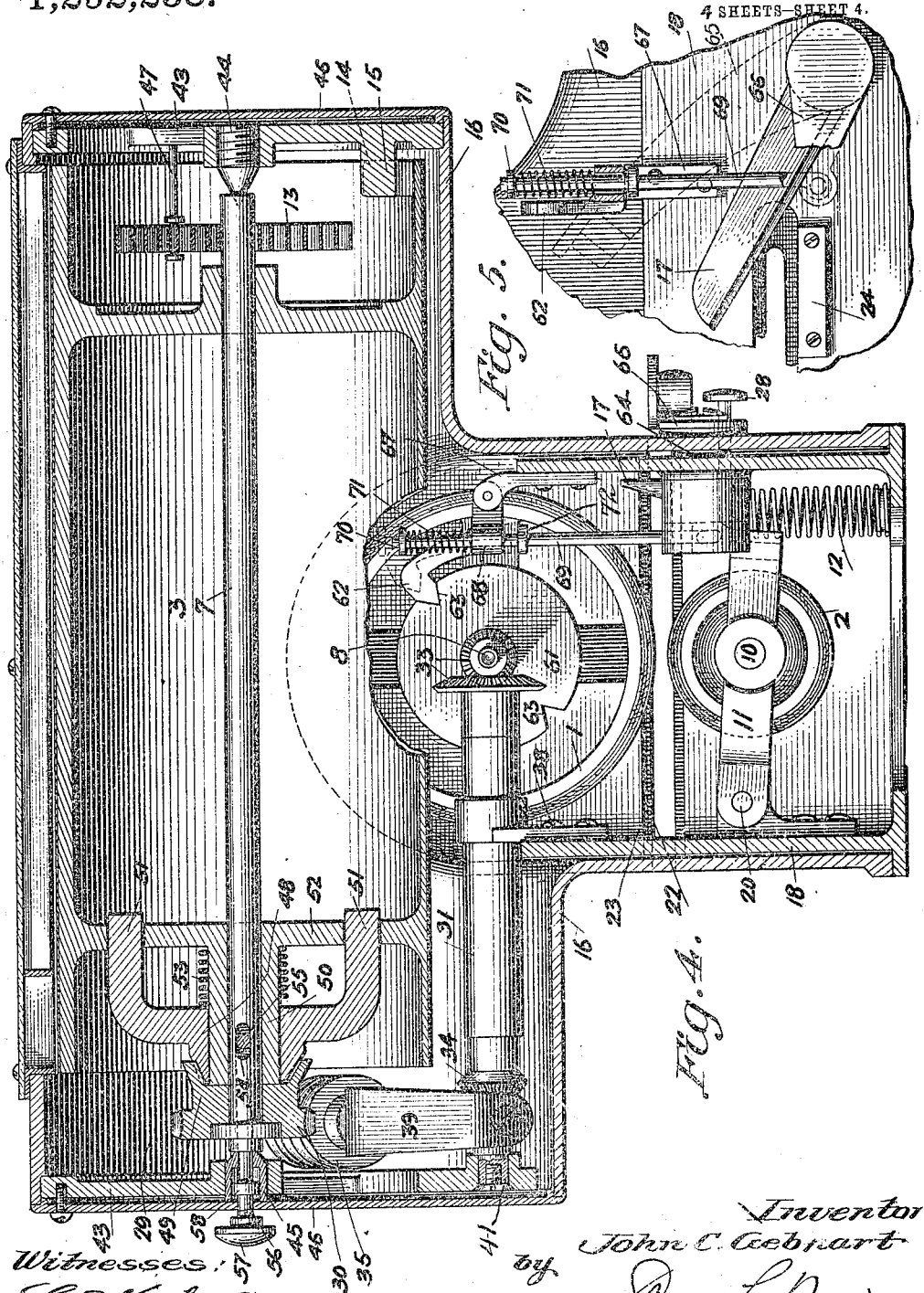

UNITED STATES PATENT OFFICE.

JOHN C. GEBHART, OF ST. LOUIS, MISSOURI, ASSIGNOR, BY MESNE ASSIGNMENTS, TO ECONOMETER COMPANY, OF ST. LOUIS, MISSOURI, A CORPORATION OF MISSOURI.

MACHINE FOR MEASURING TEXTILE FABRIC AND COMPUTING THE PRICE THEREOF.

1,252,258. Specification of Letters Patent. Patented Jan. 1, 1918.

Application filed February 21, 1917. Serial No. 150,113.

*To all whom it may concern:*

Be it known that I, JOHN C. GEBHART, a citizen of the United States, residing at St. Louis, in the State of Missouri, have invented new and useful Improvements in Machines for Measuring Textile Fabric and Computing the Price Thereof, of which the following is a specification.

This invention relates to an improved machine for measuring textile fabric and computing the price thereof. The invention proposes a machine of the type wherein the measuring and price computing operations are due to the movement of the cloth between rollers.

The principal object of the invention is to provide a machine of the character described having means for correcting or compensating for error as regards the length of material passed through the measuring rollers, thereby to insure that the measured material shall have no variation from the exact length requested.

A further object is to provide for the automatic operation of the error-compensating means in connection with the normal operations of the machine.

A further object is to provide a machine of the character stated, in which, apart from the correction of or compensation for error, the liability of error in measurement shall, in any event, be reduced to a minimum in consequence of certain checks against inaccuracy.

A further object is to provide for the locking of the power roller and therewith of the parts operated by it during the period in which the measured material is being marked or slit along the line at which it is to be torn or cut from the rest of the stock.

A further object is to provide certain novel and advantageous features of construction and organization in a machine of the specific type disclosed in my pending application Serial No. 84,899.

An embodiment of the invention is illustrated in the accompanying drawings, wherein—

Figure 1 is a plan view, partly broken away and in section, of a machine in which the features of the invention are incorporated;

Fig. 2 is a side elevation wherein one of the end heads and an end spider frame have been removed to disclose internally arranged parts;

Fig. 3 is a vertical central cross-sectional view.

Fig. 4 is a central, longitudinal sectional view in a plane at right angles to the plane of Fig. 3;

Fig. 5 is a detail elevation taken from within the machine of the knife for slitting the measured fabric along the line where said fabric is to be cut or torn;

Fig. 6 is a detail sectional view showing certain gear elements which operatively connect the power roller and the drum which carries the price value chart and length indicating scale;

Fig. 7 is a detail cross-sectional view on the line 7—7 of Fig. 6;

Fig. 8 is a detail elevation and Fig. 9 is a detail sectional view of a spider frame at one end of the machine;

Fig. 10 is a detail elevation and Fig. 11 is a detail sectional view of one of the clutch members for controlling the operation of the above-mentioned drum;

Fig. 12 is a detail view showing the construction of the clutch member which forms a companion of the one shown in Figs. 10 and 11;

Fig. 13 is a detail sectional view showing the pivotal mounting of a frame which supports a worm carrying shaft;

Fig. 14 is a detail elevation showing a modification in the construction of the disk and pawl co-acting therewith employed to secure accuracy in measurement.

Similar characters of reference designate corresponding parts throughout the several views.

The machine disclosed is, as to its principal parts, generally similar in structure, organization and mode of operation to the machine disclosed in my said pending application Serial No. 84,899. Thus, the fabric to be measured is drawn between upper and lower rollers 1 and 2, the upper roller serving as a power roller for the operation of the drum 3 which carries the length indicating scale 4 and the price value chart 5, the latter co-acting with a chart 6 for indicating price per yard. The drum 3 is mounted on a shaft 7 which is located above and extends at a right angle to the shaft 8 upon which the roller 1 is mounted. The roller 2 is mounted on a shaft 9 which is supported by cone bearings 10 in a rectangular frame 11 (Fig. 4). The frame 11 is pivotally mounted for upward and downward movement and is urged upward by a spring 12. The shaft 8 is geared to the shaft 7 whose operation is controlled by a suitable clutch. Upon the completion of the operation of the machine, the said clutch is operated to free the shaft 7 and the drum 3 is thereupon restored to its initial position or zero-set by a coil spring 13, the zero-setting movement of said drum being limited by the engagement of a lug 14 provided at one end thereof with a fixed stop lug 15. The operating parts are inclosed in a suitable casing 16. When the required length of fabric has been measured, the edge or margin of the fabric is cut by a knife 17, the slit thus made showing the line along which the measured fabric is to be cut or torn.

The construction as above described is similar to that shown in my said pending application Serial No. 84,899.

As a support for the rollers 1 and 2 a suitable frame 18 is mounted within the casing 16 and carries at its upper end cone bearings 19 for the ends of the shaft 8. The frame 11 which carries the roller 2 is pivotally connected, as at 20, to a side wall of the frame 18 and the spring 12 is preferably arranged to engage a lug or projection 21 at the free end of the frame 11. The said casing 16 has a slot 22 in its side and front walls which registers with a slot 23 in the side and front walls of the frame 18 and through which the fabric is moved during the operation of the machine. The knife 17 preferably works within the frame 18 and coacts with a stationary blade 24 secured to a side wall of said frame just below the slot 22.

When the machine is not in operation, the roller 2 may be held spaced from the roller 1 by any suitable means, for example, by the means shown in my said pending application and which comprises a pivoted latch finger 25 (Fig. 1) operated by a spring 26 to engage over a lug 27 on the frame 11 and by a finger pin or head 28 to release said lug and permit an upward movement of the frame 11 by the spring 12.

The present machine differs from the machine shown in my said pending application in that the power for the operation of the drum 3 is applied at one end instead of at the center thereof and in the construction of the gearing for operating said drum from the power roll. The relation of the drum 3 and the casing 16 is such that a clearance 29 is provided at one end of said drum in which is arranged a worm wheel 30 mounted on the shaft 7. The worm wheel 30 forms the last element of the gearing between the shafts 8 and 7; and the said gearing further includes shafts 31 and 32, the shaft 31 being driven by miter gears 33 from the shaft 8 and by miter gears 34 driving the shaft 32 which carries a worm 35 in mesh with the worm wheel 30. The shaft 31 (Fig. 6) is of sectional construction and includes telescoping slidably related parts 31$^a$ and 31$^b$, the latter fitting within the former and having key lugs 31$^c$ for which the section 31$^a$ is provided with slots 31$^d$. The bore of the section 31$^a$ incloses a spring 36 which tends to move the sections 31$^a$ and 31$^b$ relatively outward and thereby compensates for wear of the miter gears 33 and 34. The sections 31$^a$ and 31$^b$ have their bearing in a sleeve 37 secured to a bracket 38, in turn carried by the frame 18. The shaft 32 (Fig 2) is carried by a bracket 39 whose ends are equipped with cone bearings 40 for said shaft. The cone bearing 40 adjacent the miter gearing 34 (Fig. 13) has an opening through it whereby it may be fitted pivotally upon a fixed post 41 about which the bracket 39 may swing. Said bracket at its free end is acted upon by a spring 42 which insures the efficient engagement of the worm 35 and worm wheel 30 and thus compensates for wear or defective fitting of these elements.

That portion of the casing which incloses the drum 3 is provided with end spider frames 43 which carry cone bearings 44 and 45 for the shaft 7. It is preferred to provide end closure plates 46 at the outer sides of the spider frames 43. The spider frame 43 which adjoins the spring 13 carries a pin 47 to which the outer end of the spring 13 is secured and also carries the stop lug 15 previously mentioned. The spider frame 43 at the opposite end of the machine carries the post 41 upon which the bracket 39 is pivoted, as above described.

The clutch by which the operation of the drum 3 is controlled comprises a movable member 48 and a fixed member 49 (Figs. 4, 10, 11 and 12) the latter being carried by or formed with the worm wheel 30. The member 48 is slidably mounted on a hub 50 of the drum 3 and is provided with inwardly directed guide and coupling arms 51 which have a close sliding fit in openings formed in the spokes 52 which connect the hub 50 and the drum. The member 48 is moved toward the member 49 by a spring 53 which surrounds the hub 50 and bears against the member 48 and the spokes 52. The hub 50 and the shaft 7 are formed with registering longitudinal slots 54 and the clutch member 48 carries a transverse pin 55 which projects through said slots. For the purpose of disengaging the clutch elements 48 and 49, a stem 56 (Fig. 4) is provided, said stem having a sliding fit in the bores of the shaft 7 and of the cone bearing 45 and engaging the pin 55 with its free end. The stem 56 projects beyond the casing of the machine and carries an operating head 57 by which it may be conveniently moved inward against the pressure of the spring 53. In order to limit the outward movement of the stem 56, a collar 58 is mounted thereon for engagement with the adjacent end head 46 of the machine casing.

The worm wheel 30 is loose on the shaft 7 and operates the drum 3 by virtue of the arrangement of the arms 51 in the openings of the spokes 52 and of the arrangement of the pin 55 in the slots 54. When the clutch member 48 is disengaged from the clutch member 49 by the inward movement of the pin 56, the spring 13, which has been tensioned during the rotation of the drum, acts on the shaft 7 to restore the drum to its initial position, the pin 55 transmitting the rotation of said shaft to said drum.

The clutch members 48 and 49 may be of any construction suitable for the purposes in view. It is preferred, however, that their construction be such that a positive connection between them is established; and for this purpose, the clutch member 48 is formed with a series of radial V-shaped notches 59 disposed along its circumference, and the clutch member 49 is formed with a single tooth 60 for engagement in any one of the notches 59. Obviously, instead of a single tooth 60, the clutch member 49 may have several of such teeth arranged, however, to conform to the dimensions and spacing of the notches 59. Where the clutch members are constructed to positively interlock, as shown, one of said clutch members, in this instance the clutch member 48, will have a series of interlocking devices, in this instance the notches 59, whose number equals the total number of measurement units on the length indicating scale 4. Thus, assuming a total capacity of twelve yards with provision for a minimum measurement of one-eighth of a yard and considering one-eighth of a yard as a measurement unit, the scale 4 will be calibrated for ninety-six of such units and one of the clutch members will have ninety-six interlocking devices. In the embodiment shown, the clutch member 48 is thus provided with ninety-six notches 59.

According to the present invention, special provision is made for insuring that the length of material passed through the machine shall be of the exact length requested by the purchaser. Where the unit of measurement is comparatively small, e. g. an eighth of a yard, such errors in measurement as may result from the carelessness of the operator are not apt, in any event, to involve a deviation of substantially more than an inch either way. According to the present invention, such errors, whether involving a little less or a little more than the length of material requested are compensated for preferably automatically. What is now considered as a preferred construction of means for this purpose is shown in the drawings and includes essentially a notched disk 61 (Fig. 4) mounted on the shaft 8 and a pawl 62 coöperating with the disk 61. The machine shown in the drawings presupposes that the roller 1 has a circumference of a quarter of a yard and that the measuring capacity of the machine is twelve yards whereby forty-eight revolutions of the roller 1 are necessary to produce a complete revolution of the drum 3. Where, as in the example previously given, the measurement unit is one-eighth of a yard, the disk 61 will be provided with two diametrically-opposite notches 63. But the number of these notches will obviously vary with the particular measuring unit and its fractional relation to the circumferential extent of the roller 1.

When the machine is at rest, the pawl 62 engages in one of the notches 63, and when an operation of the machine has been completed, said pawl will be forced into one of said notches. If, in consequence of carelessness, the roller 1 has not been turned quite far enough to pass the requested length of material, or has been turned too far and has passed slightly more than the requested length of material, one or the other of the notches 63 with which the pawl 62 is to coöperate will be slightly out of alinement with the tooth of said pawl, but in consequence of pressure on said pawl, its tooth will engage an inclined edge of the notch and acting thereon as a cam will move the disk 61 to a position wherein the notch squarely alines with the tooth of the pawl and the tooth fully enters said notch. In such movement of the disk 61 the roller 1 participates and thereby advances or retracts the fabric being measured for a sufficient distance to correct the error and insure absolute accuracy.

While the pawl 62 could be operated for its intended purpose independently of the operation of other parts of the machine, it is preferred and manifestly advantageous to operate said pawl automatically in connection with the normal operation of the machine. As a matter of convenience and preference, the pawl 62 is operated in conjunction with the knife 17 and by the means for operating said knife; and, as in my pending application Serial No. 84,899, the knife-operating means is operatively related to the depressible frame for the lower roller to effect movements of said frame in conjunction with movements of the knife.

In the embodiment disclosed, the knife 17 is mounted on a rock shaft 64 (Figs. 1 and 4) which is journaled in the casing 16 and frame 18 and which carries on its outer end an operating lever 65 and on its inner end an arm 66 (Figs. 1 and 3) which projects over and, in operation engages, an adjacent side bar of the frame 11. The pawl 62 is pivoted to a bracket 67 carried by the frame 18 and it is provided with a suitably located collar 68. A rod 69 is pivotally connected to the end of the arm 66 in such manner that it is permitted lateral play and projects through the collar 68, the opening of which is of greater diameter than the rod 69 in order to prevent any binding in connection with the pivotal movements of the pawl 62. The rod 69 is provided at its upper end with a head 70 which confines the helical spring 71 having a bearing at its lower end against the collar 68.

That position of the pawl 62 wherein it engages fully in one of the notches 63 of the disk 61 may be said to be the normal position of said pawl. In the normal operation of the machine, i. e. during the movement of the fabric between the rollers 1 and 2, the cutting edge of the knife 17 is disposed wholly above the slot 23, as shown in Fig. 4. When the pawl is moved outward from its normal position to a position wherein its point will rest on the periphery of the disk 61, as shown in dotted lines in Fig. 4, it will, through the spring 71, raise the rod 69 a corresponding extent. Such movement of the rod 69 moves the knife 17 farther above the slot 23, whereby said knife will have a short idle movement before it cuts the fabric held between the rollers 1 and 2. In the operation of the knife 17 by the lever 65, and during the idle movement of said knife, the head 70 tends to compress the spring 71 in case there be any resisting bearing for the lower end of said spring. Now, if either of the notches 63 be not squarely alined with the tooth of the pawl 62, the contact of such tooth with the inclined face of the notch will provide a resistance enabling the compression of the spring 71 by the head 70; and the effect of such compression of the spring 71 will be to put inward pressure on the pawl 62 whereby said pawl, acting on the inclined face of the notch 63 as a cam, effects a movement of the disk 61 to a position wherein said notch 63 will squarely aline with the tooth of the pawl 62 and said pawl will fully enter said notch. The effect of such movement of the disk 61, as above explained, is to produce a corresponding movement of the roller 1 whereby the fabric held between it and the roller 2 is advanced or retracted sufficiently to correct the error. When the lever 65 is pushed down and the pawl 62 is fully engaged in one of the notches 63, the power roller 1 and therewith the drum 3 are locked against further rotation; but the spring 71, as is obvious, permits a further downward movement of the rod 69 incident to the continued movement of the lever 65 for the purpose of moving the knife 17 across the slot 21 and of depressing the frame 11 by the arm 66. When the finger pressure on the lever 65 is relieved, the spring 71 restores the rod 69, arm 66, knife 17 and lever 65 to normal position; and in order to limit the re-setting movement of these parts, the rod 69 is preferably provided with a collar 72 which engages the under side of the collar 68.

In the normal operation of the machine, the pawl 62 rides idly upon the periphery of the disk 61 and in the continued rotation of said disk passes into and from the notches 63, the pressure of its engagement in said notches being determined by the weight of the parts suspended from it by the rod 69 and, therefore, being comparatively light so that said pawl does not interpose any serious obstacle to the rotation of the roller 1. However, each engagement of the pawl 62 in a notch 63 will obviously manifest itself to the operator of the machine by a click which will be evident to the ear and by a slightly added load which will be evident to the sense of touch. In this way, and apart from the readings on the scale 4, the operator will be aware of every length, corresponding to the unit of measurement, which passes between the rollers 1 and 2. The pawl 62 thus, aside from its error-correcting function, imposes an additional check on the accuracy of the measuring operation and virtually insures that any deficiency or overplus of measurement shall not exceed that which is within the capacity of positive and automatic correction. This added function of the pawl 62 is not only a check against carelessness, but it is of positive advantage in those cases where the operator, by a deficiency of eye-sight, may have difficulty in following the readings of the scale 4, in that the operator may determine the length of goods passed by keeping count of the clicks of the pawl 62 as it is passed by the notches 63.

In other respects, the operation of the machine is the same as disclosed in my co-pending application Serial No. 84,899.

Fig. 14 illustrates a modified construction of disk, here designated 61$^a$, and of pawl, here designated 62$^a$, this modification being the full equivalent of the disk 61 and pawl 62 previously described. The modification consists in forming the disk with diametrically opposite flat faces 63$^a$ in substitution for the notches 63, these faces being related as chords to the circle of the disk, and in forming the pawl with a flat face in substitution for a tooth. The coöperative action of the flat faces 63$^a$ and of the pawl 62$^a$ is generally the same as that of the notches 63 and pawl 62 and will be obvious from the drawing. In other respects, the modified construction is similar to the one previously described.

It will be understood that no specific description herein contained is intended to impose any limitation upon the scope of the appended claims which does not inhere in the language thereof.

I claim as my invention—

1. In a machine of the class described, in combination, a power roller over which the fabric to be measured is passed, length indicating means geared to said roller, and means operatively connected to said roller and operable upon the completion of the measuring operation for moving the power roller to a definite position selected with regard to the unit of measurement thereby to advance or retract the measured fabric and compensate for an error in measurement.

2. In a machine of the class described, in combination, a power roller over which the fabric to be measured is passed, length indicating means geared to said roller, means for marking the measured fabric to indicate the line along which said fabric is to be cut or torn, means operable upon the completion of the measuring operation for moving the power roller to a definite position selected with regard to the unit of measurement thereby to advance or retract the measured fabric and compensate for an error in measurement and operative connections between said marking means and roller moving means whereby the latter is operated automatically in connection with an operation of the former.

3. In a machine of the class described, in combination, a power roller over which the fabric to be measured is passed, length indicating means geared to said roller, a disk rotatable with said roller and having its periphery notched in accordance with the fractional relation of the unit of measurement to the circumference of said roller and a pawl operable by co-action with the disk to move the power roller to a definite position selected with regard to the unit of measurement thereby to advance or retract the measured fabric and compensate for an error in measurement.

4. In a machine of the class described, in combination, a power roller over which the fabric to be measured is passed, length indicating means geared to said roller, a disk mounted on the shaft of said roller for rotation therewith and having its periphery provided with V-shaped notches arranged in accordance with the fractional relation of the unit of measurement to the circumference of said roller and a pawl co-acting with said disk.

5. In a machine of the class described, in combination, a power roller over which the fabric to be measured is passed, length indicating means geared to said roller, a disk mounted on the shaft of said roller for rotation therewith and having its periphery provided with V-shaped notches arranged in accordance with the fractional relation of the unit of measurement to the circumference of said roller, a pawl co-acting with said disk, a manually operated lever and operative connections between said lever and said pawl.

6. In a machine of the class described, in combination, a power roller over which the fabric to be measured is passed, length indicating means geared to said roller, a disk mounted on the shaft of said roller for rotation therewith and having its periphery provided with V-shaped notches arranged in accordance with the fractional relation of the unit of measurement to the circumference of said roller, a pawl co-acting with said disk, a knife for slitting the fabric along the line at which it is to be cut or torn, a lever for operating the knife, and resilient connections between said lever and pawl.

7. In a machine of the class described, in combination, a power roller over which the fabric to be measured is passed, length indicating means geared to said roller, a disk mounted on the shaft of said roller for rotation therewith and having its periphery provided with V-shaped notches arranged in accordance with the fractional relation of the unit of measurement to the circumference of said roller, a pawl co-acting with said disk, a rock shaft, a manually operated lever for said rock shaft, an arm projecting from said rock shaft, a stem pivotally connected to said arm, said pawl having an aperture through which said stem projects and a spring confined upon the upper portion of said stem and acting upon said pawl.

8. In a machine of the class described, in combination, a power roller, a measuring drum arranged above said roller and transversely thereto, a worm wheel for operating said drum, a worm actuating said worm wheel, a shaft carrying said worm, gearing between said shaft and the shaft of said roller, a movably mounted bracket supporting said worm carrying shaft and means acting on said bracket to hold said worm in engagement with said worm wheel.

9. In a machine of the class described, in combination, a power roller, a measuring drum arranged above said roller and transversely thereto, a shaft arranged below said drum and parallel thereto, gearing between said shaft and the shaft of said roller, a worm wheel for operating said drum, a worm actuating said worm wheel, a shaft carrying said worm and geared to said first named shaft, a pivotally mounted bracket supporting said last named shaft and a spring acting on said bracket whereby to hold said worm in engagement with said worm wheel.

10. In a machine of the class described, in combination, a power roller, a measuring drum arranged above said roller and transversely thereto, a shaft geared to said drum, a second shaft arranged below said drum and parallel thereto, said second shaft comprising key coupled sections and a spring acting on said sections to move them relatively outward, miter gearing between one of said sections and said first named shaft and miter gearing between the other section and the shaft of said roller.

In testimony whereof I have hereunto set my hand in presence of two subscribing witnesses.

JOHN C. GEBHART.

Witnesses:
   JAS. P. DAWSON,
   E. D. PINKERTON.